US012168267B2

(12) United States Patent
Sistach et al.

(10) Patent No.: US 12,168,267 B2
(45) Date of Patent: Dec. 17, 2024

(54) METHOD FOR TREATING AN INTERNAL DEFECT IN A PART

(71) Applicant: SAFRAN AIRCRAFT ENGINES, Paris (FR)

(72) Inventors: Hugo Jean-Louis Sistach, Moissy-Cramayel (FR); Romaric Jean-Marie Piette, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 382 days.

(21) Appl. No.: 17/604,044

(22) PCT Filed: Mar. 25, 2020

(86) PCT No.: PCT/EP2020/058403
§ 371 (c)(1),
(2) Date: Oct. 15, 2021

(87) PCT Pub. No.: WO2020/212104
PCT Pub. Date: Oct. 22, 2020

(65) Prior Publication Data
US 2022/0143758 A1    May 12, 2022

(30) Foreign Application Priority Data

Apr. 16, 2019   (FR) ...................................... 1904036

(51) Int. Cl.
*B23K 26/53* (2014.01)
*B29C 67/04* (2017.01)
*B29C 73/34* (2006.01)

(52) U.S. Cl.
CPC .............. *B23K 26/53* (2015.10); *B29C 67/04* (2013.01); *B29C 73/34* (2013.01)

(58) Field of Classification Search
CPC ....... B29C 73/34; B29C 67/04; B29C 64/277; B29C 64/282; B23K 26/53
See application file for complete search history.

(56) References Cited

U.S. PATENT DOCUMENTS

2008/0206897 A1   8/2008  Yoo
2012/0138223 A1   6/2012  Fang et al.
(Continued)

FOREIGN PATENT DOCUMENTS

DE   102015216402 A1 *  3/2017
EP         2881246 A1    6/2015
EP         3581371 A1 * 12/2019 ......... B29C 35/0272

OTHER PUBLICATIONS

Search Report issued in French Patent Application No. 1904036 dated Jan. 8, 2020.
(Continued)

*Primary Examiner* — George R Koch
(74) *Attorney, Agent, or Firm* — Pearne & Gordon LLP

(57) ABSTRACT

A method for treating an internal defect in a part made of a material, involves: a) detecting and locating the internal defect in the part; b) defining, inside the part, at least one target volume which at least partially includes the defect; c) for each target volume, simultaneously irradiating the target volume by at least two beams which converge in the target volume and are continuous, whereby a treated area is obtained. The energy applied to the target volume by each beam is less than a threshold energy for sintering the material, and the sum of the energies applied to the target volume by each of the beams is greater than or equal to a transformation threshold energy that corresponds to the threshold energy for sintering or melting the material; the material of the part is partially transparent to said beams.

8 Claims, 2 Drawing Sheets

(56) References Cited

U.S. PATENT DOCUMENTS

2017/0028505 A1   2/2017  Hosseini et al.
2018/0250890 A1*  9/2018  Claussen ................ B33Y 50/02
2019/0016052 A1*  1/2019  Clark ..................... B33Y 10/00

OTHER PUBLICATIONS

International Search Report for issued in Application No. PCT/EP2020/058403 dated Jul. 17, 2020.
Written Opinion for PCT/EP2020/058403 dated Jul. 17, 2020.
English translation of Office Action issued in Chinese Patent Application No. 202080029570.7 dated Oct. 27, 2023.

\* cited by examiner

METHOD FOR TREATING AN INTERNAL DEFECT IN A PART

This is the National Stage of PCT international application PCT/EP2020/058403, filed on Mar. 25, 2020 entitled "METHOD FOR TREATING AN INTERNAL DEFECT IN A PART", which claims the priority of French Patent Application No. 1904036 filed Apr. 16, 2019, both of which are incorporated herein by reference in their entirety.

TECHNICAL FIELD

The present invention relates to a method for treating a defect in a part, making it possible to repair this defect.

PRIOR ART

During the manufacture of parts, an internal defect (porosity, lack of melting, cracks, etc.) may appear in the part, whether for parts manufactured with standard methods such as foundry or with more recent methods such as additive manufacturing on a powder bed.

However, the presence of such an internal defect can, in certain fields such as in particular aeronautics, be inacceptable since it can reduce the resistance to fatigue and cause the failure of the part earlier than expected. Such a part, if it is not repaired, is therefore scrapped.

The presence of this type of internal defect is in general detected by carrying out a non-destructive test of the part (by X-rays, tomography, microtomography, etc.). These defects can also be detected during the manufacture of the part via a control of the method during manufacture (control in process), such as for example a microtomography, the application of X-rays during manufacturing, monitoring a melting bath, etc. By way of example, with laser melting on a powder bed, it is possible to trace potential defects after manufacture via the observation of the melting bath during manufacture.

The purpose in particular of the invention is to correct such internal defects at the very core of the part.

DISCLOSURE OF THE INVENTION

For this purpose, the invention proposes a method for treating an internal defect in a part made of a material, the method comprising the steps of:
 a) detecting and locating the internal defect in the part;
 b) defining, inside the part, at least one target volume which at least partially includes the defect;
 c) for each target volume, simultaneously irradiating the target volume by at least two beams which converge in the target volume and are continuous, whereby a treated area is obtained;
 wherein the energy applied to the target volume by each beam is less than a threshold energy for sintering the material, and the sum of the energies applied to the target volume by each one of the beams is greater than or equal to a transformation threshold energy, the transformation threshold energy corresponding to the threshold energy for sintering the material, when it is desired to obtain a selective sintering of the material in the target volume, or to the threshold energy for melting the material, when it is desired to obtain a selective melting of the material in the target volume,
 and wherein the material of the part is partially transparent to said at least two beams.

According to a first alternative, step b) defining several target volumes, the target volumes are simultaneously irradiated in step c).

According to a second alternative, step b) defining several target volumes, the target volumes are successively irradiated in step c).

According to an alternative, step b) consists of a definition of a unique target volume, inside the part, entirely including the defect.

According to an embodiment of the invention, the method further comprises, after step c), a step of controlling the treated area in such a way as to check if the initial defect has disappeared, the step of controlling comprising a detection of any new internal defect and, in the case where a new internal defect is detected in the treated area, this new internal defect is located and steps b) and c) are repeated.

Advantageously, the detecting of an internal defect is carried out by a non-destructive technique. This can for example be a so-called NDT (for "Non-Destructive Testing") such as tomography, microtomography or X-rays.

Preferably, in step c), the at least two beams are focussed in the target volume.

Preferably, the at least two beams converge at their focussing point.

Advantageously, in step c), the at least two beams have the same surface energy.

According to a preferred embodiment of the invention, the at least two beams number three.

Preferably, the at least two beams are energy beams of the same nature and are chosen from laser beams, microwave beams, UV beams and IR beams.

The method according to the invention makes it possible to treat defects of which the largest dimension can be comprised between 10 µm and 500 µm. Preferably, each target volume has its largest dimension which is comprised between 10 µm and 1 mm. By oversizing the target volume with respect to the defect to be treated, this makes it possible to melt or sinter the area located in the surrounding area of the defect and thus homogenise the material in this area. By way of example, if a defect of the porosity type is remelted by remelting an oversized volume containing the defect and as the remelting is done without the adding of material, this makes it possible to "diffuse" the porosity in several small porosities over the entire remelted volume.

In the present disclosure, the expression "comprised between . . . and . . . " must be understood as including the limits.

Thanks to the invention, it is possible to carry out a melting or sintering in three dimensions in a target volume inside the volume of the part. It is therefore possible, with this method, to repair or to easily limit internal and one-off defects of the part, without exterior adding of material, defects that would not be acceptable and which, in normal time, would have led to scrapping of the part.

BRIEF DESCRIPTION OF THE DRAWINGS

The invention shall be better understood and other details, characteristics and advantages of the invention shall appear when reading the following description given as a non-limiting example in reference to the accompanying drawings wherein.

DETAILED DISCLOSURE OF PARTICULAR EMBODIMENTS

Figure 1A:
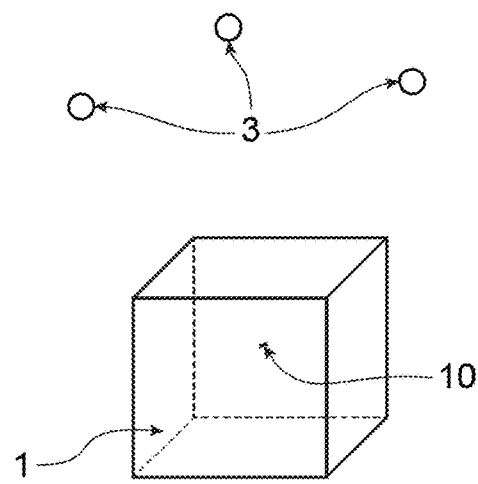
FIGS. 1a to 1c show steps of a first embodiment of the method for treating according to the invention.

In accordance with the invention, at least two beams are used, preferably three beams, in order to simultaneously irradiate a target volume of a damaged part, so as to treat (here, repair) an internal defect.

The beams are continuous.

The part to be treated can be made of a metallic material (metal or alloy), ceramic or polymer.

The choice of the type of beam to be used is made according to the energy that must be deposited in the target volume so that the material of said target volume melts or is sintered, thus causing the defect to disappear. This therefore depends on the material, but also if it is desired to obtain a sintering or a melting of the material. If it is desired to obtain a sintering of the material, the sum of the energies deposited by each one of the beams in the target volume, when they simultaneously irradiate this target volume by being converged thereon, must be greater than or equal to a threshold energy required for sintering. If it is desired to obtain a melting of the material, the sum of these energies in the target volume must be greater than or equal to a threshold energy required for the melting.

It is also necessary that the material of the part be partially transparent to the beams chosen. A material is considered to be partially transparent to a beam when it absorbs up to 60% of the beam (the value 0% being excluded).

Preferably, energy beams of the same nature will be chosen.

The beams can be produced by the same source, of which the beam is divided into as many beams as necessary, or by separate sources.

By way of example, microwave beams can be used to carry out the melting of a target volume in a metal part made from a nickel alloy (for example of the Inconel™ 718 type) or from a titanium alloy (for example TA6V), in such a way as to obtain a total power comprised between 200 and 400 W and/or a linear energy comprised between 0.01 J/mm and 1 J/mm. For example, in order to obtain a power of 200 W, two 100 W beams can be used. Thus compressor blades can be realised, for example.

To melt a target volume of a part made from thermosetting polymer, for example an epoxide resin, used in manufacturing acoustic panels or motor covering parts (damping elements for example), UV beams can be used with a power comprised between 60 and 100 W and/or a surface energy comprised between 0.001 and 0.05 J/m m$^2$, or laser beams with a power comprised between 20 and 40 W and/or a surface energy comprised between 0.005 and 0.025 J/mm$^2$.

The detecting and the locating of the defect have to be precise enough so that it is possible to determine, according to the shape and the trajectory of the defect, where to define the target volume or volumes (in other terms, where to direct the beams in the target volume or volumes) wherein the material is intended for melting or being sintered.

The types of defects targeted preferably have their largest dimension which is between 10 μm and 500 μm (limits included). This can for example be a crack. A detecting and locating precision of ±10 μm is therefore sought, a precision that is provided by microtomography.

Advantageously, it is possible to have, after step c) (which is in fact a step of repairing the defect), another step of detection that makes it possible to check that the defect has indeed been treated and repaired. If the defect is still present, it is then possible to locate this defect and redo steps b) for defining at least one target volume and c) simultaneous irradiation of this or these target volumes and so on until disappearance of the defect.

Certain defects filled with a void and that do not have enough material can be difficult to treat with this method and can require several steps of repair (i.e. several repetitions of the sequence of steps b) and c)) with a displacement of the target volume or volumes towards an external surface of the part, where the defect can then be repaired, displaced to the surface, by adding material.

Figure 1B:
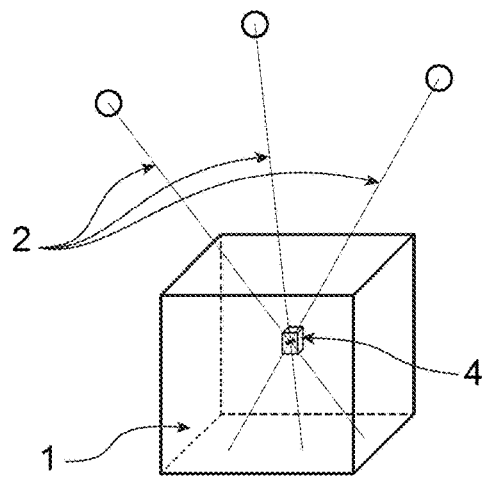
Figure 1C:
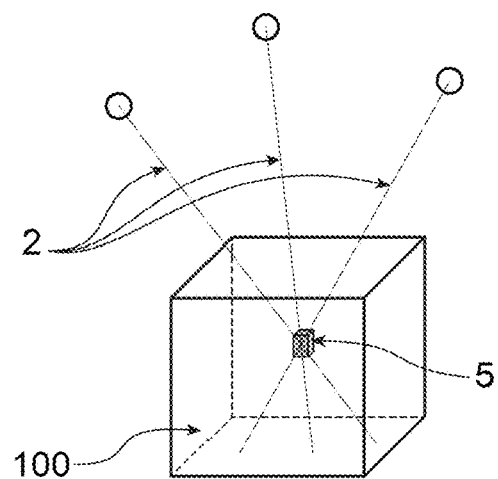

A first embodiment of the method according to the invention is shown in FIGS. 1a to 1c. In FIG. 1a, the defective part 1 having an internal defect 10 is symbolised by a cube. The origins of the beams 2 are represented by circles 3.

The defect 10 is detected and located, then three beams 2 of the same nature are used to locally melt or sinter a target volume 4 of the defective part 1, the target volume 4 entirely containing the defect 10. The sum of the energies of the three beams is thus conveyed to a precise local area of the part where it is desired to melt the material, since as in the case of a satellite triangulation, a precise point in space can be described from three straight lines. In FIG. 1b, the three beams are simultaneously directed towards the target volume 4, in such a way that they are converging in this target volume 4. The target volume 4 contains the internal defect 10 and is therefore located inside the cube representing the defective part 1. The material contained in the target volume 4 is heated until the melted state, then, when it is cooled, it gives a target volume 5 wherein the material is melted or sintered, thus obtaining a repaired part 100 (FIG. 1c). The treated area is here the target volume 5 with the melted or sintered material.

Figure 2A:
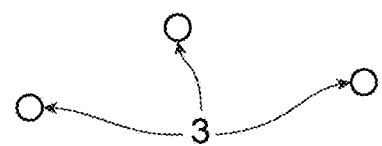
FIGS. 2a to 2d show steps of a second embodiment of the method for treating according to the invention.
Figure 2A:
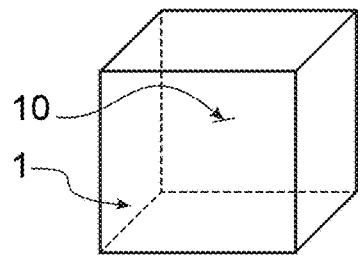
Figure 2B:
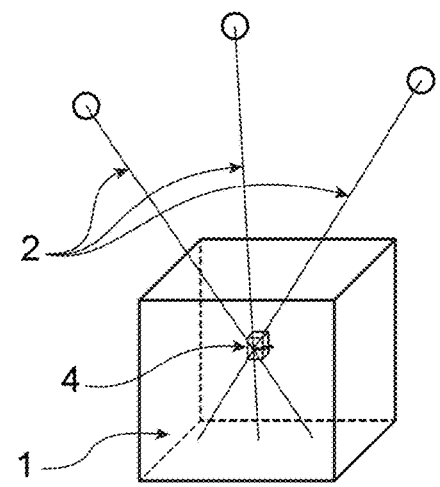
Figure 2C:
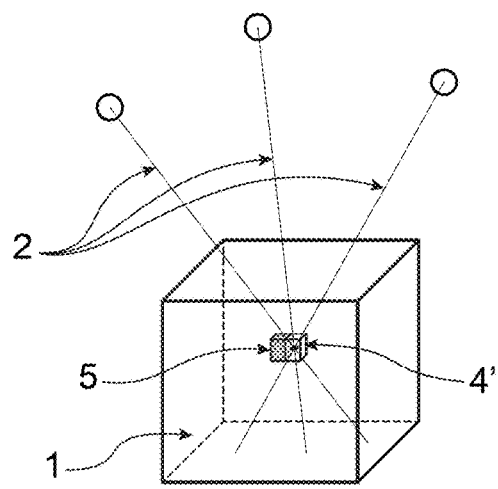
Figure 2D:
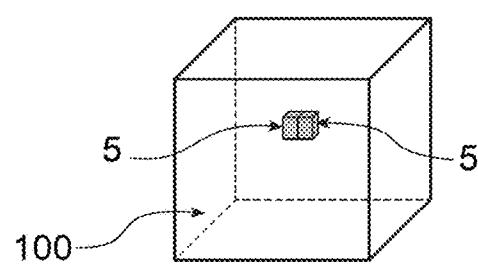

A second embodiment of the method in accordance with the invention is shown in FIGS. 2a to 2d. In FIG. 2a, the defective part 1 includes an internal defect 10, that is shown larger than that of FIG. 1a. A first target volume 4 is defined containing a portion of the defect 10 and it is treated by simultaneously directing, in this first target volume 4, three beams 2 which converge in this first target volume 4 (FIG. 2b). The portion of the defect contained in this first target volume will disappear when the material of the target volume 4 melts or is sintered in order to become the melted or sintered target volume 5. The other portion of the defect 10 will then be treated by defining a second target volume 4', juxtaposed to the first target volume 4 (and to the melted or sintered target volume 5). The three beams 2 are directed in this second target volume 4' in such a way that the three beams converge in the second target volume 4' (FIG. 2c). After treatment, the treated area of the part includes the two target volumes 5 with the sintered or melted material and the repaired part 100 (FIG. 2d) is obtained.

Of course, the sources of the beams are disposed at sufficient distances from one another so as to be able to ensure treating the desired area with precision.

According to a preferred alternative of the invention, each one of the three beams is configured so that the energy applied to the target volume is equal to ⅓ of the energy required to melt or sinter the material contained in the target volume 4 or 4'. Thus, the melting or the sintering of the material contained in the target volume will take place only in the case of a simultaneous concentration of the three beams in the target volume, thus preventing any undesired melting or sintering in case of an incorrect positioning of the beams.

The method according to the invention has for example been used to repair a polymer resin part comprising an internal defect having the dimensions 250 µm×100 µm×50 µm by directing on the defect three UV beams each having a power of 30 W (or a total power of 90 W) and a beam diameter of 100 µm at the point of convergence with a speed of 2 mm/s.

What is claimed is:

1. A method for treating an internal defect in a part made of a material, the method comprising the steps of:
    a) detecting and locating the internal defect in the part by a non-destructive technique;
    b) defining, inside the part, a first target volume which contains a first portion of the defect and a second target volume juxtaposed to the first target volume which contains a second portion of the defect;
    c) for each target volume of the first target volume and the second target volume, simultaneously irradiating the target volume by three beams which converge in the target volume and are continuous, whereby a treated area is obtained;
    wherein the second portion of the defect is treated after the first portion of the defect has disappeared,
    wherein an energy applied to the target volume by each beam is less than a threshold energy for sintering the material, and a sum of the energies applied to the target volume by each one of the beams is greater than or equal to a transformation threshold energy, the transformation threshold energy corresponding to the threshold energy for sintering the material, when it is desired to obtain a selective sintering of the material in the target volume, or to a threshold energy for melting the material, when it is desired to obtain a selective melting of the material in the target volume,
    and wherein the material of the part is partially transparent to said three beams.

2. The method according to claim 1, further comprising, after step c), a step of controlling the treated area in such a way as to check if the initial defect has disappeared, the step of controlling comprising a detection of any new internal defect and, in a case where a new internal defect is detected in the treated area, this new internal defect is located and steps b) and c) are repeated.

3. The method according to claim 1, wherein, in step c), the three beams are focussed in the target volume.

4. The method according to claim 3, wherein the three beams converge at their focussing point.

5. The method according to claim 1, wherein, in step c), the three beams have a same surface energy.

6. The method according to claim 1, wherein the three beams are energy beams of a same nature and are chosen from laser beams, microwave beams, UV beams and IR beams.

7. The method according to claim 1, wherein each target volume has its largest dimension which is comprised between 10 µm and 1 mm.

8. The method according to claim 1, wherein the defect has a largest dimension of between 10 µm and 500 µm.

* * * * *